(12) United States Patent
Kemkemian et al.

(10) Patent No.: US 7,864,110 B2
(45) Date of Patent: Jan. 4, 2011

(54) METHOD FOR BEAM FORMATION BY CALCULATION, IN PARTICULAR ADAPTED TO THE COMPENSATION OF FAILURES OF ACTIVE MODULES OF A RADAR WITH ELECTRONIC SCANNING

(75) Inventors: Stephane Kemkemian, Paris (FR); Jean-Paul Artis, Plouzane (FR)

(73) Assignee: Thales (FR)

( * ) Notice: Subject to any disclaimer, the term of this patent is extended or adjusted under 35 U.S.C. 154(b) by 81 days.

(21) Appl. No.: 11/915,379

(22) PCT Filed: May 24, 2006

(86) PCT No.: PCT/EP2006/062621

§ 371 (c)(1),
(2), (4) Date: Nov. 24, 2007

(87) PCT Pub. No.: WO2006/125817

PCT Pub. Date: Nov. 30, 2006

(65) Prior Publication Data

US 2008/0180323 A1    Jul. 31, 2008

(30) Foreign Application Priority Data

May 24, 2005   (FR) .................................. 05 05211

(51) Int. Cl.
*H01Q 3/26* (2006.01)
*G01S 7/40* (2006.01)
(52) U.S. Cl. .................... 342/372; 342/74; 342/174
(58) Field of Classification Search .................. 342/372
See application file for complete search history.

(56) References Cited

U.S. PATENT DOCUMENTS

| 5,003,314 | A | * | 3/1991 | Berkowitz et al. .......... 342/372 |
| 5,083,131 | A | | 1/1992 | Julian |
| 5,416,489 | A | | 5/1995 | Mailloux |
| 5,767,806 | A | * | 6/1998 | Watanabe et al. .......... 342/373 |
| 5,867,123 | A | | 2/1999 | Geyh et al. |

(Continued)

FOREIGN PATENT DOCUMENTS

WO          0108259         2/2001

*Primary Examiner*—Thomas H Tarcza
*Assistant Examiner*—Matthew M Barker
(74) *Attorney, Agent, or Firm*—Lowe Hauptman Ham & Berner, LLP

(57) ABSTRACT

The invention relates to a method for beam formation by calculation. For each defective active module of rank ip, the missing samples of the microwave signal a(ip) are calculated by one or more non-adaptive interpolations using the samples coming from the active modules in nominal operating mode situated in the neighborhood of the defective active modules, the beam being formed as if the interpolated samples a(ip) were the real measurements. In particular, the invention is applicable to the compensation for the effects of failures of one or more active modules distributed over an antenna of a radar with electronic scanning. The method according to the invention can notably be implemented within an airborne weather radar.

9 Claims, 9 Drawing Sheets

U.S. PATENT DOCUMENTS

| | | |
|---|---|---|
| 5,923,284 A | 7/1999 | Artis et al. |
| 5,945,942 A | 8/1999 | Artis et al. |
| 5,955,985 A | 9/1999 | Kemkemian et al. |
| 5,963,163 A | 10/1999 | Kemkemian et al. |
| 6,023,238 A | 2/2000 | Cornic et al. |
| 6,339,398 B1 | 1/2002 | Redvik et al. |
| 6,437,731 B1 | 8/2002 | Henrio et al. |
| 6,675,923 B1 | 1/2004 | Artis et al. |
| 6,859,167 B2 | 2/2005 | Artis |
| 7,000,722 B2 | 2/2006 | Artis et al. |
| 7,286,093 B2 | 10/2007 | Artis et al. |
| 7,289,077 B2 | 10/2007 | Artis et al. |
| 2002/0011946 A1 | 1/2002 | Artis et al. |
| 2002/0171579 A1 | 11/2002 | Artis et al. |
| 2003/0052810 A1 | 3/2003 | Artis et al. |
| 2007/0030209 A1 | 2/2007 | Artis et al. |

* cited by examiner

METHOD FOR BEAM FORMATION BY CALCULATION, IN PARTICULAR ADAPTED TO THE COMPENSATION OF FAILURES OF ACTIVE MODULES OF A RADAR WITH ELECTRONIC SCANNING

CROSS-REFERENCE TO RELATED APPLICATIONS

The present Application is based on International Application No. PCT/EP2006/062621, filed May 24, 2006 which in turn corresponds to France Application No. 05 05211, filed on May 24, 2005, and priority is hereby claimed under 35 USC §119 based on these applications. Each of these applications are hereby incorporated by reference in their entirety into the present application.

TECHNICAL FIELD

The invention relates to a method for beam formation by calculation. In particular, the invention is applicable to the compensation for the effects of failures of one or more active modules distributed over an antenna of a radar with electronic scanning. The method according to the invention can notably be implemented within an airborne weather radar.

BACKGROUND OF THE INVENTION

An antenna with electronic scanning can comprise a large number of active modules. Accordingly, in order to optimize the availability of a radar comprising an antenna with electronic scanning, the impact of the failure of one or more active modules on the main functions of the radar must be limited. It is thus desirable that the loss of several active modules does not compromise the receiving function of the radar in order to reach an optimum level of service. These constraints are justified notably when such a radar is used for applications requiring a high level of security and reliability of operation such as that required, for example, in the case of an airborne radar on a commercial aircraft, for example of the weather radar type.

In the case of a radar whose beam is formed by calculation, the full set of samples coming from the active modules is used in reception. When an active module is defective due to a malfunction or fault, the samples can no longer be employed for the formation of the beam without significantly degrading the reception performance of the radar. The tolerance to these failures of active modules can notably be improved by using interpolation methods for the spatial samples missing due to failures. The radar beam is then formed by calculation using the interpolations as if they were real samples.

For this purpose, there exist linear prediction methods which, by means of the valid samples coming from the active modules in nominal operation, allow the complete signal as it is received by the radar to be decomposed into a sum of sinusoidal signals with amplitudes and frequencies that said methods seek to estimate. Aside from the discrete Fourrier transform, which does not directly provide this decomposition, the other linear interpolation techniques require the estimation of covariance matrices. These adaptive techniques may be readily applied to antennas whose active modules are uniformly distributed over the surface of the antenna.

However, the estimation of covariance matrices is complex and imprecise on an antenna whose active modules are distributed according to a non-constant distribution law over the surface of the antenna. The linear prediction methods are therefore maladapted to this type of antenna due to their complexity and their cost.

SUMMARY OF THE INVENTION

The invention aims notably to overcome the aforementioned drawbacks. For this purpose, the subject of the invention is a method for formation by calculation of a beam whose main lobe of a microwave signal is oriented in a direction Uzf pointed to by a scanning antenna comprising active modules, the scanning being effected in one or more planes. The active modules are identified by a rank i and by coordinates in a reference base forming a plane within which the active modules of the antenna are substantially included. For each defective active module of rank ip, the missing samples of the microwave signal $a(\hat{\imath}p)$ are calculated by one or more non-adaptive interpolations using the samples coming from the active modules in nominal operating mode situated in the neighborhood of the defective active modules. The beam is formed as if the interpolated samples $a(\hat{\imath}p)$ were the real measurements.

In another embodiment, the active modules of a scanning antenna in a plane are arranged in rows and have as coordinates a position along an axis perpendicular to the rows of active modules of the antenna. The active modules deliver, after sampling, samples $a(i)$. The samples of the missing microwave signal $a(\hat{\imath}p)$ are defined according to the following formula:

$$a(\hat{\imath}p) = \frac{z(ip+1)-z(ip)}{z(ip+1)-z(ip-1)} \times a(ip-1) + \frac{z(ip)-z(ip-1)}{z(ip+1)-z(ip-1)} \times a(ip+1).$$

The non-adaptive interpolation step can, for example, comprise the following steps:
  elimination of the phase gradient in the neighborhood of a particular direction Uz1 of the samples of the microwave signal coming from the active modules in nominal operating mode situated in the neighborhood of the defective active modules;
  non-adaptive linear interpolation of the missing samples of the microwave signal;
  rephasing of the samples obtained in the preceding step.

In another embodiment, the active modules of a scanning antenna in a plane are arranged in rows and have as coordinates a position (z(i)) along an axis perpendicular to the rows of active modules of the antenna. The active modules deliver, after sampling, samples $a(i)$. The samples of the missing microwave signal $a(\hat{\imath}p)$ are defined, for a particular direction Uz1, according to the following formula:

$$a(\hat{\imath}p) = \left( \frac{z(ip+1)-z(ip)}{z(ip+1)-z(ip-1)} \times a(ip-1) + \frac{z(ip)-z(ip-1)}{z(ip+1)-z(ip-1)} \times a(ip+1) \right) \times \exp\left(+j2\pi \frac{Uz-Uz1}{\lambda} z(ip)\right)$$

The method according to the invention can notably comprise the following steps:
  formation of the beam by excluding the missing samples of the microwave signal $a(\hat{\imath}p)$;
  calculation by a non-adaptive linear interpolation of the estimations of the samples of the missing microwave signal $a_1(\hat{\imath}p), \ldots, a_P(\hat{\imath}p)$ starting from P assumptions of particular direction Uz1, Uz2, ..., Uzp;

calculation of the signals $S_1 \ldots S_P$ according to the formula $S_1=S_0+W(ip)\times a_1(ip)\ldots$, $S_P=S_0+W(ip)\times a_P(ip)$ where $W(ip)$ corresponds to the weighting coefficient of the sample from the defective module ip;

normalization of the signals $S_1 \ldots S_P$ in such a manner that all the beams thus formed have the same gain in the directed orientation Uzf;

selection of the signal $S_1 \ldots S_P$ whose measured power is the lowest amongst the full set of calculated signals.

The number of particular directions can then be a function of the number of defective active modules.

The active modules can for example be distributed according to a non-constant distribution law over the surface of the antenna.

The method according to the invention may notably be applied to a radar designed for the detection and localization of weather phenomena.

The invention presents notably the advantage that the additional cost in computation power resulting from the invention is very low compared to that required by a channel formation without compensation.

BRIEF DESCRIPTION OF THE DRAWINGS

Other features and advantages of the invention will become apparent with the aid of the description that follows with regard to the appended drawings which show.

DETAILED DESCRIPTION OF THE DRAWINGS

Figure 1:
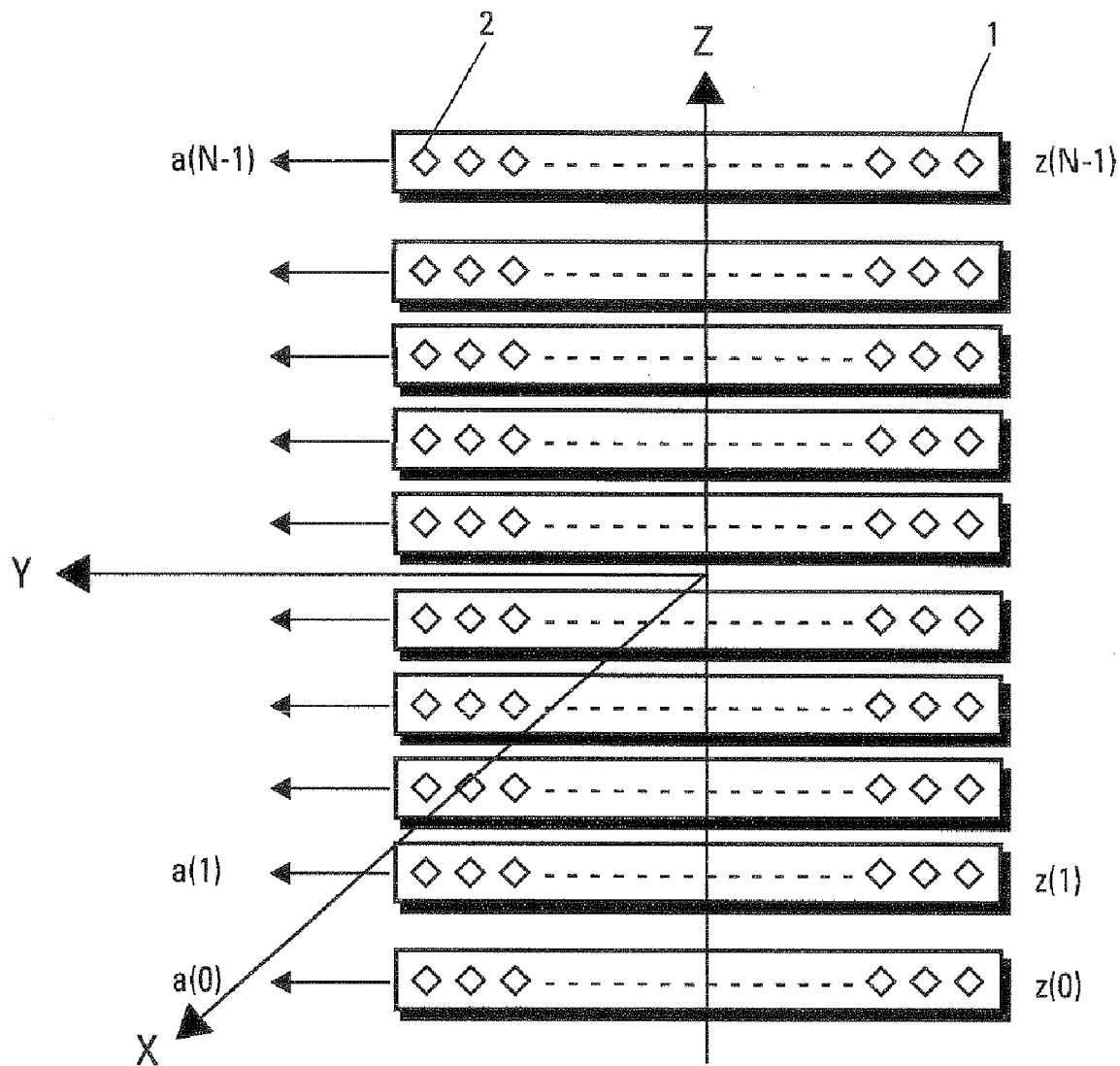
FIG. 1, a distribution of rows of active modules of an antenna with electronic scanning in one plane.

FIG. 1 shows the distribution of the rows of active modules of an antenna with electronic scanning in one plane. The description that follows illustrates the method according to the invention taking as a support for the description a radar equipped with an antenna with electronic scanning in one plane. The method according to the invention is more generally applicable to any radar comprising an antenna with active modules.

FIG. 1 shows an orthogonal reference frame comprising a point O situated in the same plane as the antenna at the center of the latter, together with the axes OX, OY and OZ forming an orthogonal reference base, OY and OZ being in the plane of the antenna. All the coordinates mentioned in the following description will be in this reference frame.

The antenna with electronic scanning illustrated in FIG. 1 comprises a set of rows 1, each row 1 comprising elementary sources 2. The rows 1 comprise, in this example, a number N of elementary sources 2. The position on the axis OZ of any given row 1 of rank i, i being in the range between 0 and N−1, is denoted z(i). The phase center of all the rows 1 is aligned with the axis OZ and, for a given row 1 of rank i, has the coordinates $$M(i) = \begin{bmatrix} 0 \\ 0 \\ z(i) \end{bmatrix}.$$

The distance between two rows 1 that are consecutive along the axis OZ is not necessarily constant nor regular.

The operation described in the following corresponds to the case of a calibrated radar, in other words whose response in phase and in amplitude of all the elements is the same or only depends on the difference in step due to the distribution of the active modules 2. Moreover, the individual diagram, denoted $g(\vec{U})$, of the active modules 2 is identical.

When the radar receives a signal of wavelength $\lambda$ and of power flux $\Phi$ coming from a direction $$\vec{U} = \begin{pmatrix} \sqrt{1-Uy^2-Uz^2} \\ Uy \\ Uz \end{pmatrix}$$

identified by its direction cosines (Uy, Yz), a voltage a(i) is created by this signal at the output of each row 1 of rank i. The voltage a(i) is proportional to $$\sqrt{\Phi} \times g(\vec{U}) \times \exp\left(-\frac{2\pi}{\lambda}\vec{U}\cdot\overrightarrow{M(i)}\right)$$

$$\text{or } \sqrt{\Phi} \times g(\vec{U}) \times \exp\left(-\frac{2\pi \times Uz}{\lambda}z(i)\right).$$

A weighting denoted W(i) is assigned to each row 1 of rank i. The direction of formation of the main lobe oriented toward the targeted direction is denoted Uzf. When the operation of the radar is nominal, in other words there are no defective active modules, the signal received by the radar corresponding to the contribution of all of the rows 1 is equal to:

$$S = \sum_{i=0}^{N-1} a(i) \times W(i) \times \exp\left(\frac{2\pi \times Uzf}{\lambda}z(i)\right)$$

or $$S \propto \sqrt{\Phi} \times g(\vec{U}) \times \sum_{i=0}^{N-1} W(i) \times \exp\left(\frac{2\pi \times (Uzf-Uz)}{\lambda}z(i)\right).$$

Figure 2:
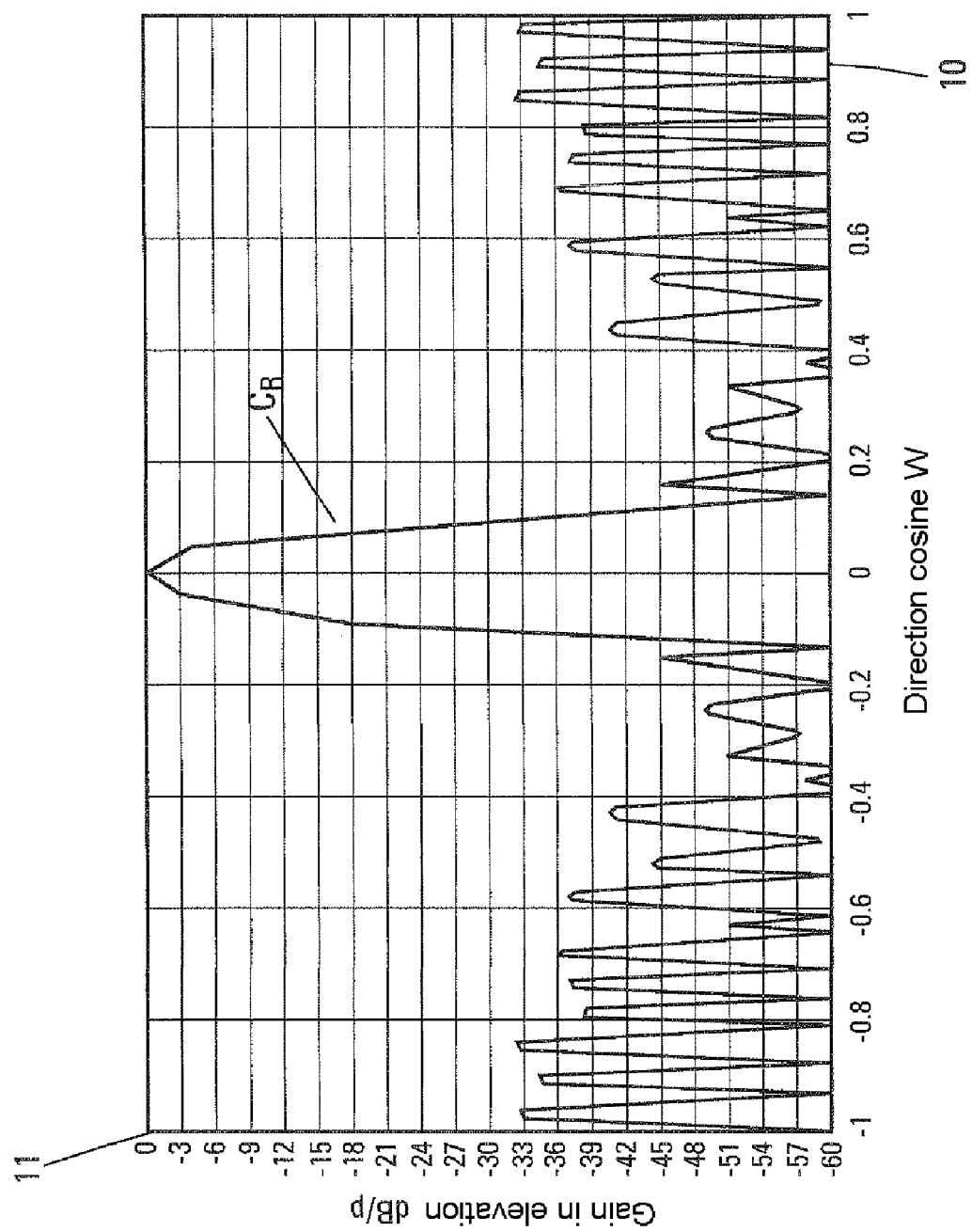
FIG. 2, a diagram representing the gain in elevation of the received signal when the radar is in nominal operation.

FIG. 2 is a diagram representing the gain in elevation of the signal received when the radar is in nominal operation. The diagram comprises an abscissa axis 10 indicating the direction cosine W relating to the angular difference with respect to the targeted direction Uzf. The abscissa axis 10 is scaled from −1 to 1. The diagram comprises an ordinate axis 11 indicating the relative power gain in elevation of the signal received by the radar expressed in decibels per unit of power, the reference power, i.e. 0 dB/p, being assigned to the gain received in the targeted direction Uzf. The ordinate axis 11 is scaled from 0 to −60 dB/p. In this diagram, a curve $C_R$ represents the gain in elevation of the received signal for a given direction cosine, the radar being in nominal operation. Beam formation by calculation tends to form a main lobe oriented in the targeted direction while at the same time minimizing the gain in the other directions potentially carrying sources of interference.

Figure 3:
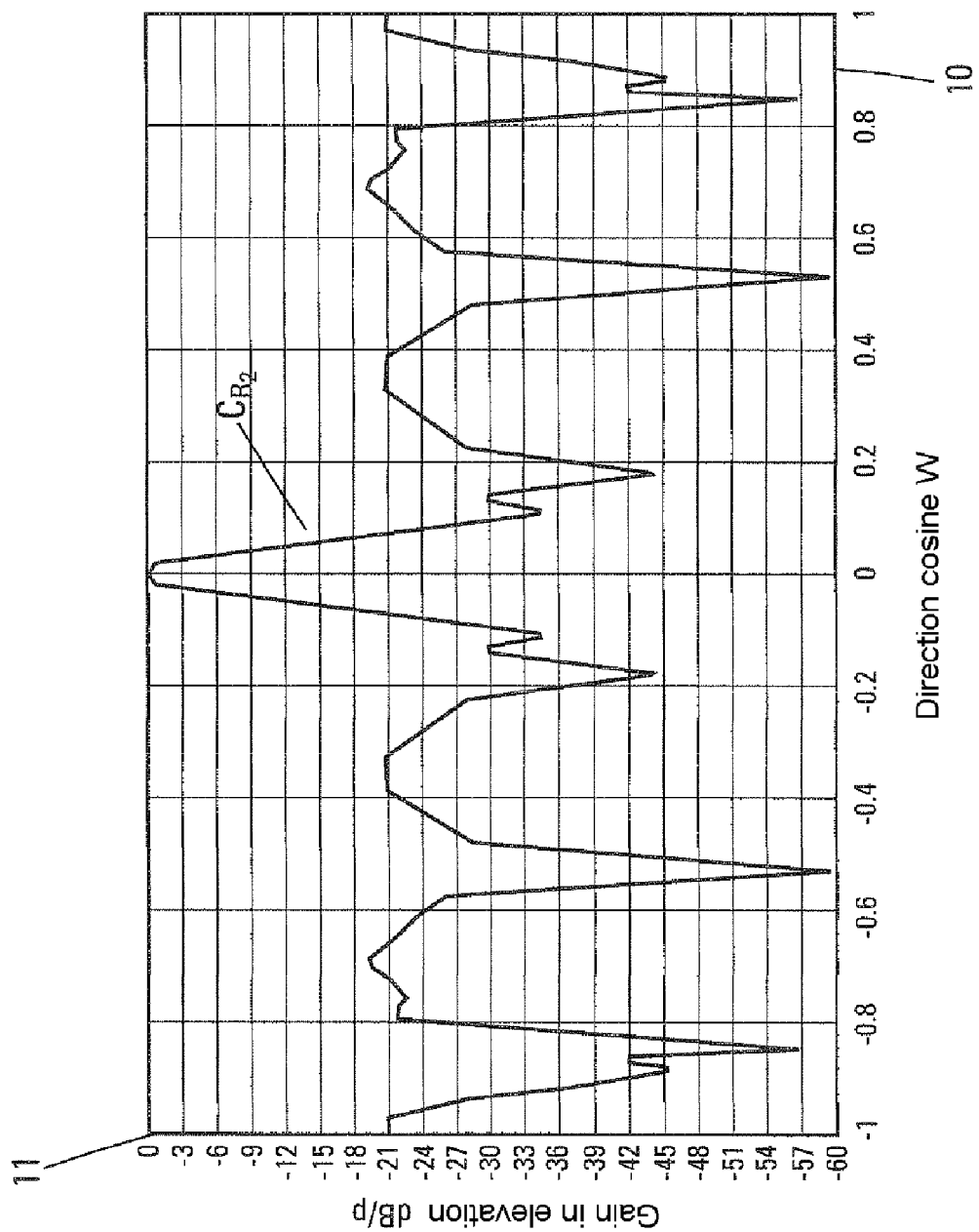
FIG. 3, a diagram representing the gain in elevation of the received signal when the radar is in impaired operation without correction.

FIG. 3 is a diagram representing the gain in elevation of the received signal when the radar is in impaired mode and no correction is applied. The diagram comprises an abscissa axis 10 indicating the direction cosine W relating to the angular difference with respect to the targeted direction Uzf. The abscissa axis 10 is scaled from −1 to 1. The diagram comprises an ordinate axis 11 indicating the relative power gain in elevation of the signal received by the radar expressed in decibels per unit of power, the reference power, i.e. 0 dB/p, being assigned to the gain received in the targeted direction Uzf. The ordinate axis 11 is scaled from 0 to −60 dB/p. In this diagram, a curve $C_{R2}$ represents the gain in elevation of the received signal for a given direction cosine, the radar being in impaired mode and no correction being applied. The diagram illustrates the degradations suffered by an antenna comprising 35 rows 1, two of which are for example defective. The comparison between the diagram in FIG. 2 and the diagram in FIG. 3 shows an increase between the nominal mode and the impaired mode, illustrated by a rise in the secondary lobes 31 of around 30 dB above the gain of the interference noise signals arriving angular-shifted by 0.3 in direction cosine.

Figure 4:
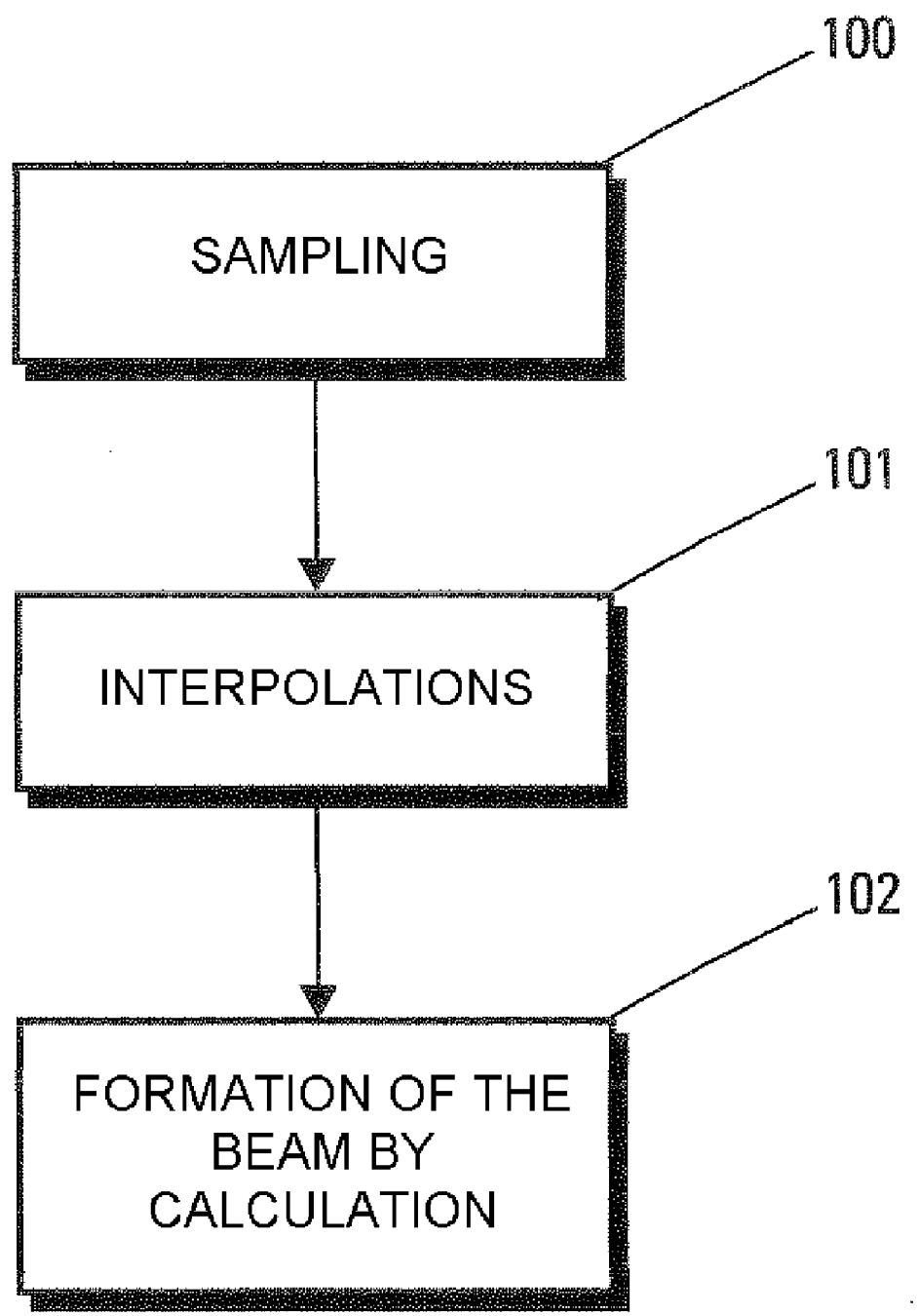
FIG. 4, the steps of the method according to the invention.

FIG. 4 shows an example of a series of steps resulting in the implementation of the method according to the invention. In a sampling step 100, the microwave signals coming from the active modules 2 are sampled. The samples obtained at step 100 coming from the active modules in a nominal operating state are subsequently completed in step 101 with samples of interpolated microwave signals corresponding to the defective active modules 2. All of the samples available following steps 100 and 101 are subsequently used by a step 102 in order to form the beam by calculation in the direction Uzf targeted by the radar.

The method according to the invention additionally comprises the step 101 for linear interpolation of missing spatial samples. The linearity of the interpolation step 101 according to the invention allows other spectral analysis methods to be used downstream. The failure of at least one active module 2 of a row 1 leads to the loss of one sample $a(\hat{\imath}p)$. An estimation of this sample $a(\hat{\imath}p)$ can be calculated using the samples from its neighborhood by a linear operation. Thus, it can be written that:

$$a(\hat{\imath}p) = f[\ldots, a(ip-2), a(ip-1), a(ip+1), a(ip+2), \ldots]$$

or $$a(\hat{\imath}p) = \sum_{k=-P, k\neq ip}^{+P} \alpha(k) \cdot a(ip+k).$$

In the case where there is only one defective signal source, the series of received signals a(i) corresponds to the sampling, possibly irregular, of a spatial sinusoid according to the points z(i). The spatial frequency of this sinusoid is given by the term Uz/λ. To within the noise which is assumed to be independent from one source to another, the samples a(i) are disposed on a circle in the complex plane.

According to the method according to the invention, the missing samples are estimated by linear interpolation in a non-adaptive fashion, in other words where their interpolation does not depend on the variation of the received samples over time. The modulus of the radar signal is denoted A whereas the thermal noise relating to one row 1 of rank i is denoted b(i). One step of the method according to the invention amounts to recovering the missing sample $$a(ip) = A\exp\left(-j2\pi\frac{Uz}{\lambda}z(ip)\right)$$

with the knowledge of the samples adjacent to the defective one equal to $$a(ip-1) = A\exp\left(-j2\pi\frac{Uz}{\lambda}z(ip-1)\right) + b(ip-1)$$

and $$a(ip+1) = A\exp\left(-j2\pi\frac{Uz}{\lambda}z(ip+1)\right) + b(ip+1).$$

The missing sample can notably be calculated in step 101 by a single linear interpolation of the method according to the invention with the following formula $$a(\hat{\imath}p) = \frac{z(ip+1)-z(ip)}{z(ip+1)-z(ip-1)} \times a(ip-1) + \frac{z(ip)-z(ip-1)}{z(ip+1)-z(ip-1)} \times a(ip+1).$$

In step 102, the beam is formed as if the interpolated sample $a(\hat{\imath}p)$ were the real measurement. The interpolation error ε is then substantially equal to $$\cos\left[\pi \times \frac{z(ip+1)-z(ip-1)}{\lambda}Uz\right] - 1$$

if the distribution of the active modules 2 is substantially regular.

Figure 5:
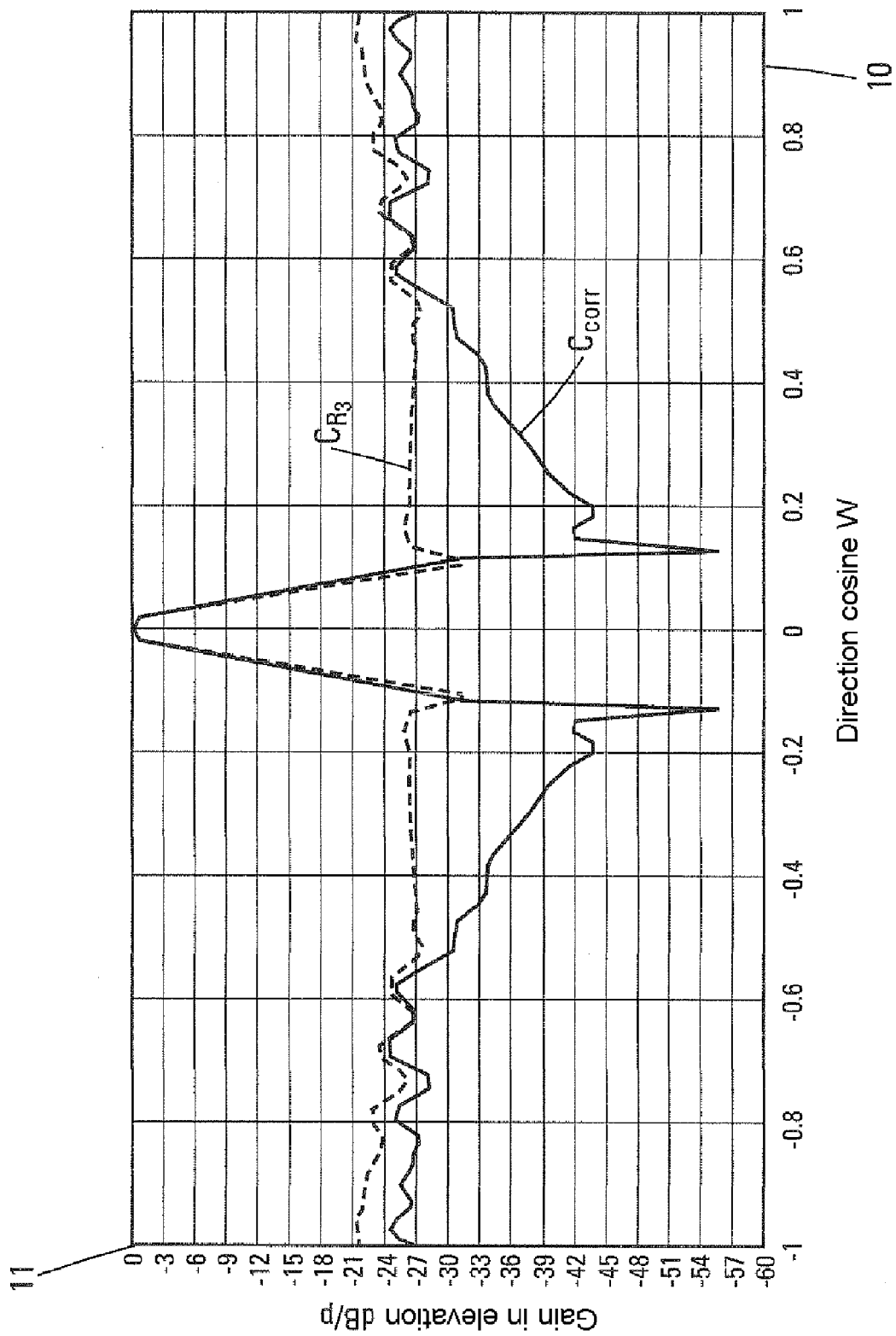
FIG. 5, a diagram representing the gain in elevation of the received signal and of the signal corrected by a method according to the invention implementing a single linear interpolation when the radar is in impaired operation.

FIG. 5 is a diagram representing the gain in elevation of the received signal and of the signal corrected by a method according to the invention implementing a single linear interpolation such as is described hereinabove when the radar is in impaired operation. The diagram comprises an abscissa axis 10 indicating the direction cosine W relating to the angular difference with respect to the targeted direction Uzf. The abscissa axis 10 is scaled from −1 to 1. The diagram comprises an ordinate axis 11 indicating the relative power gain in elevation of the signal received by the radar expressed in decibels per unit of power, the reference power, i.e. 0 dB/p, being assigned to the gain received in the targeted direction Uzf. The ordinate axis 11 is scaled from 0 to −60 dB/p. In this diagram, a curve $C_{R3}$ represents the gain in elevation of the received signal for a given direction cosine, the radar being in nominal operation. In this diagram, a curve $C_{Corr}$ represents the gain in elevation of the received signal corrected by a method according to the invention implementing a single linear interpolation such as was previously described for a given direction cosine, the radar being affected by the failure of one defective source. As can be observed in FIG. 4, this embodiment proves effective in the case where the direction of arrival of the signals Uz is close to 0.

The preceding description illustrates an example where only one row 1 of active modules 2 is defective. The same embodiment of the method according to the invention can be used to compensate for the failure of several rows 1 of active modules 2. In such a case, the same processing operation as described hereinabove is applied to each row 1 of defective active modules 2. Moreover, if several consecutive rows 1 of active modules 2 are defective, the rows 1 in nominal operation surrounding the defective rows are used for the interpolation. In the case of a radar comprising an antenna with electronic scanning in several planes, the interpolation is effected on all of the adjacent elements in the direction of the axis OZ, but also in the direction of the axis OY.

Figure 6:
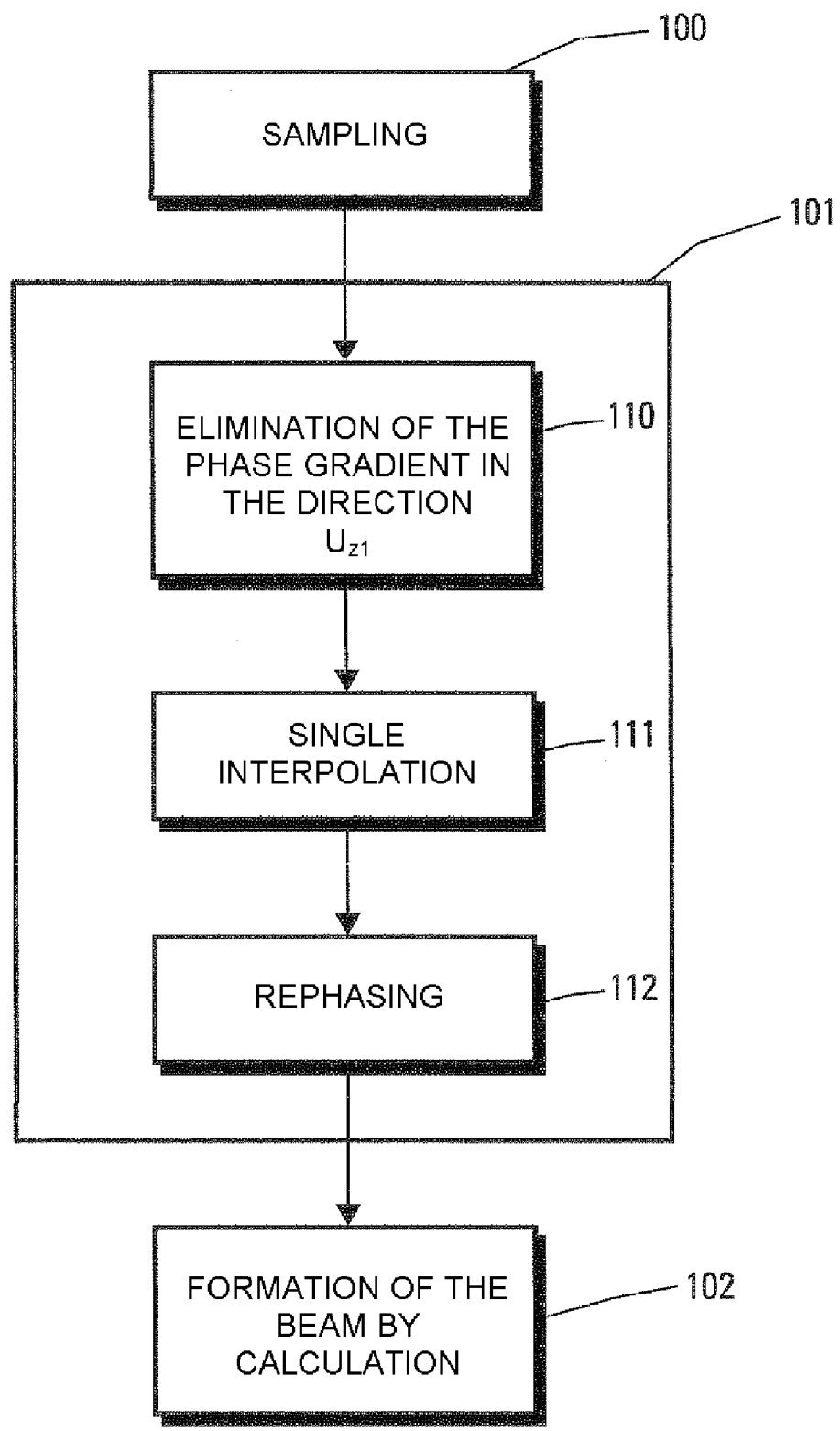
FIG. 6, the steps of the method according to the invention implementing a single linear interpolation optimized in the neighborhood of a given direction.

FIG. 6 shows the steps of the method according to the invention implementing a single linear interpolation optimized in the neighborhood of a given direction. The interpolation steps 101 are adapted in order to enhance the efficiency of the rejection of the noise signals in a given direction Uz1. Step 101 can notably comprise three steps. In a step 110, the method according to the invention eliminates the phase gradient in the neighborhood of a particular direction Uz1 of the samples of the microwave signal coming from the active modules 2 in nominal operating mode situated in the neighborhood of the defective active modules 2 then, in a step 111, calculates a new interpolated value. This interpolated value is subsequently rephased in a step 112 as a function of the position z(ip) of the faulty element. The missing sample $a_1(ip)$ may be calculated from the following equation:

$$a(\hat{ip}) = \left( \frac{z(ip+1) - z(ip)}{z(ip+1) - z(ip-1)} \times a(ip-1) + \frac{z(ip) - z(ip-1)}{z(ip+1) - z(ip-1)} \times a(ip+1) \right) \times \exp\left( +j2\pi \frac{Uz - Uz1}{\lambda} z(ip) \right)$$

The sampling and the formation of the beam by calculation in step 102 is carried out in an identical manner to the embodiment previously described.

Figure 7:
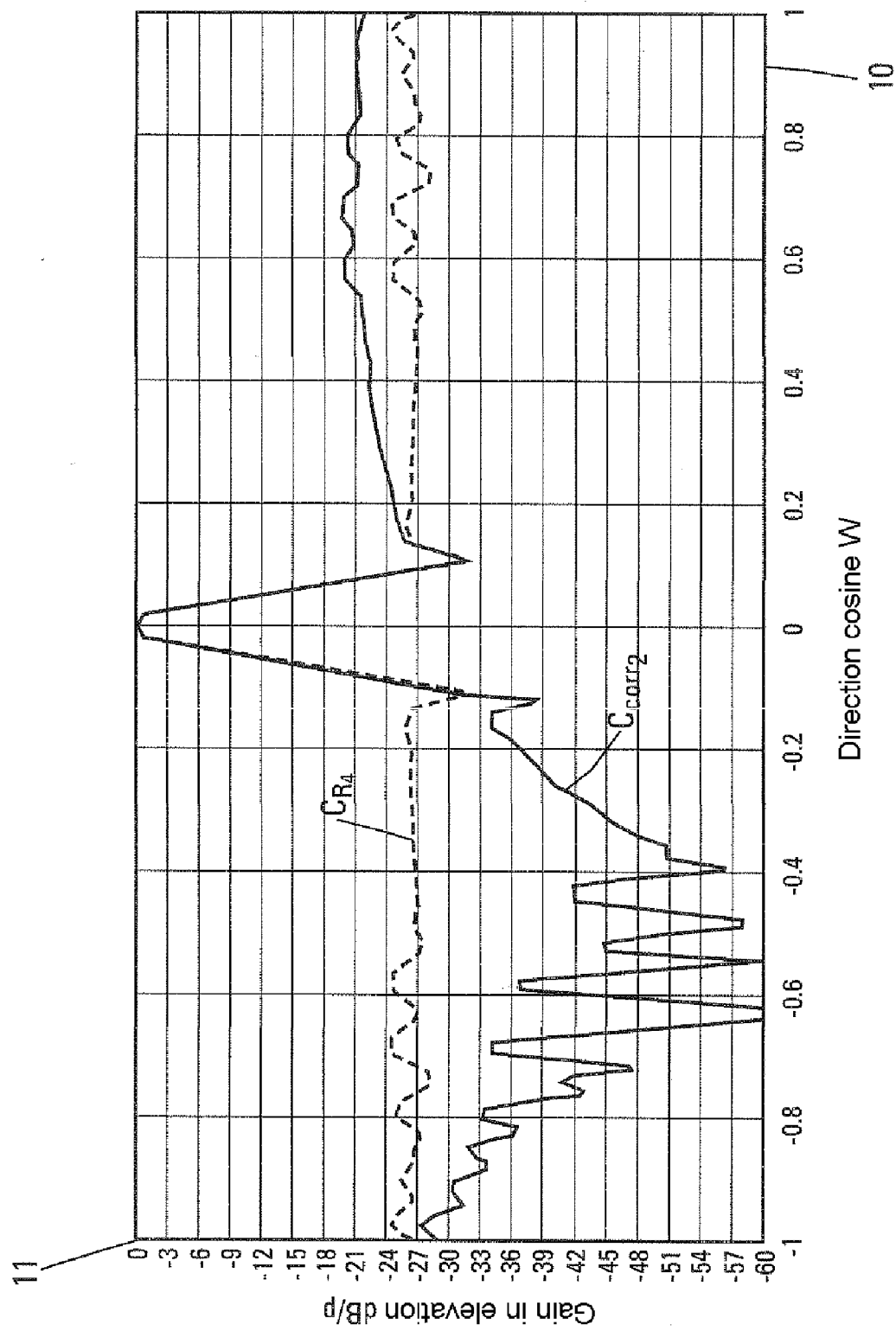
FIG. 7, a diagram representing the gain in elevation of the received signal and of the signal corrected by a method according to the invention implementing a single linear interpolation optimized in the neighborhood of a given direction when the radar is in impaired operation.

FIG. 7 is a diagram representing the gain in elevation of the received signal and of the signal corrected by a method according to the invention implementing a single linear interpolation such as is described hereinabove optimized in the neighborhood of a given direction when the radar is in impaired operation. The diagram comprises an abscissa axis 10 indicating the direction cosine W relating to the angular difference with respect to the targeted direction Uzf. The abscissa axis 10 is scaled from −1 to 1. The diagram comprises an ordinate axis 11 indicating the relative power gain in elevation of the signal received by the radar expressed in decibels per unit of power, the reference power, i.e. 0 dB/p, being assigned to the gain received in the targeted direction Uzf. The ordinate axis 11 is scaled from 0 to −60 dB/p. In this diagram, the curve $C_{R4}$ represents the gain in elevation of the received signal for a given direction cosine, the radar being in nominal operation. In this diagram, the curve $C_{Corr2}$ represents the gain in elevation of the received signal for a given direction cosine corrected by a method according to the invention implementing a single linear interpolation optimized in the neighborhood of a given direction, the radar being affected by the failure of one faulty source. FIG. 5 illustrates a correction optimized in the direction Uz1 equal to −0.5 radians.

The preceding description illustrates an example where a single row 1 of active modules 2 is defective. The same embodiment of the method according to the invention can be used to compensate for the failure of several rows 1 of active modules 2. In such a case, the same processing operation as described hereinabove is applied to each row 1 of defective active modules 2. Moreover, if several consecutive rows 1 of active modules 2 are defective, the rows 1 in nominal operation surrounding the defective rows are used for the interpolation. In the case of a radar comprising an antenna with electronic scanning in several planes, the interpolation is effected on all of the adjacent elements in the direction of the axis OZ, but also in the direction of the axis OY in order to enhance the efficiency of the rejection of the noise signals in a given solid angle oriented with respect to a direction Uz1.

Figure 8:
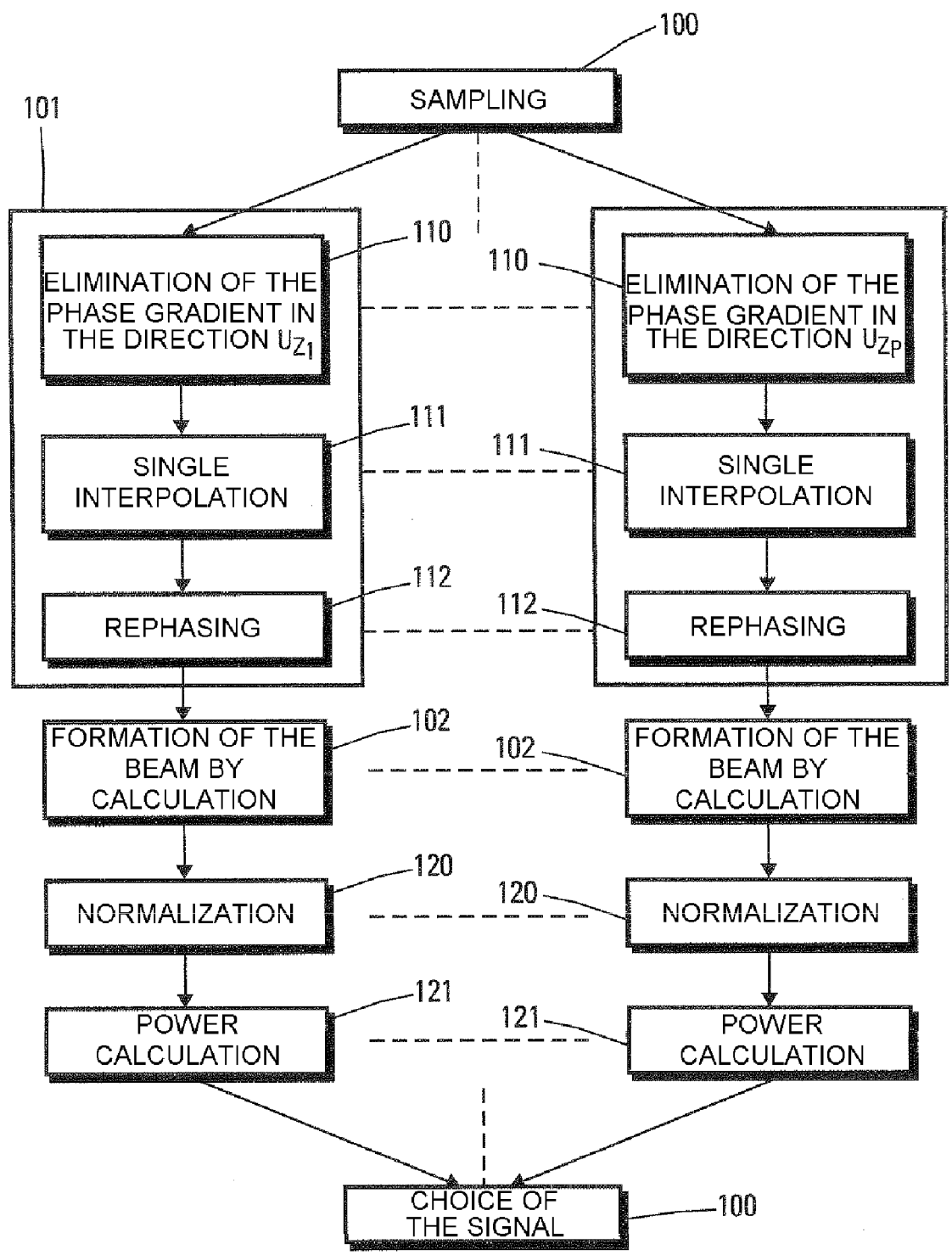
FIG. 8, the steps of the method according to the invention implementing a multiple linear interpolation.

FIG. 8 shows the steps of the method according to the invention implementing a multiple linear interpolation. The sampling step 100 is identical to the other embodiments. Similarly, the interpolation step 101 comprising notably the step 110 for elimination of the phase gradient in a given direction, the single interpolation step 111 and the rephasing step 112 are identical to the preceding embodiment. The method according to the invention in the example in FIG. 8 carries out a number P of interpolations of the samples corresponding to the defective rows based on P assumptions of particular directions Uz1, Uz2, ..., Uzp by repeating step 101 described previously. For each missing sample of rank ip, a number P of estimations $a_1(\hat{ip}), \ldots, a_P(\hat{ip})$ are obtained. At step 102, the beam is subsequently formed by excluding the faulty samples using the formula $$S_0 = \sum_{i \neq ip} W(i) \times \exp\left( \frac{2\pi \times (Uzf - Uz)}{\lambda} z(i) \right).$$

The beam is completed with the P interpolations of the faulty active modules 2, which yields the following P results: $S_1 = S_0 + W(ip) \times a_1(\hat{ip}), \ldots, S_P = S_0 + W(ip) \times a_P(\hat{ip})$. The resulting signals $S_1 \ldots S_P$ are subsequently normalized at step 120 in such a manner that all the beams thus formed have the same gain in the directed orientation Uzf, in other words in the direction pointed to by the antenna. From the resulting signals $S_1 \ldots S_P$, the signal whose power calculated in step 121 is the lowest amongst all of the calculated signals is retained in step 122, in other words the signal j, j being in the range between 1 and P, corresponding to the equation $|S_j| = \min(|S_1|, |S_2|, \ldots, |S_P|)$.

As the gain from all the diagrams is identical in the main lobe, the criterion amounts to minimizing the gain in the direction of the interference. This minimization is valid for several interference noise signals as long as they are relatively close to one another. In the case of a waveform with no ambiguity in distance, for example of the Low Frequency of Recurrence (LFR) type, in airborne applications, this assumption is practically always verified.

The formation of the beam by calculation in step 102 is carried out in an identical manner to the embodiment previously presented. In this embodiment, the greater the number of defective rows 1 of active modules 2, the more advantageous it is to increase the number of assumptions of particular directions Uz1, Uz2, ..., Uzp.

Figure 9:
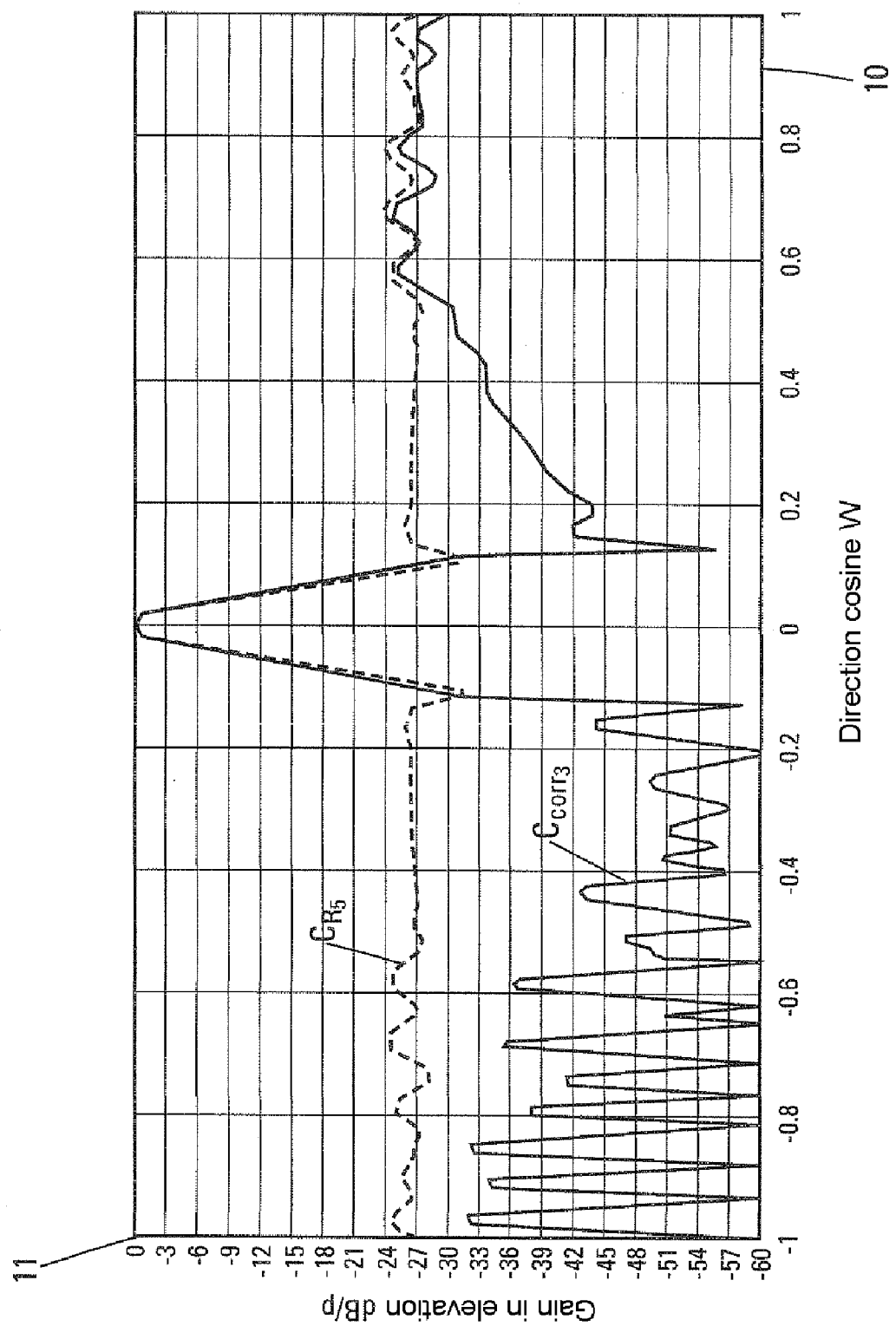
FIG. 9, a diagram representing the gain in elevation of the received signal and of the signal corrected by a method according to the invention implementing a multiple linear interpolation when the radar is in impaired operation.

FIG. 9 is a diagram representing the gain in elevation of the received signal and of the signal corrected by a method according to the invention implementing a multiple linear interpolation such as is described hereinabove optimized in the neighborhood of a given direction when the radar is in impaired operation. The diagram comprises an abscissa axis 10 indicating the direction cosine W relating to the angular difference with respect to the targeted direction Uzf. The abscissa axis 10 is scaled from −1 to 1. The diagram comprises an ordinate axis 11 indicating the relative power gain in elevation of the signal received by the radar expressed in decibels per unit of power, the reference power, i.e. 0 dB/p, being assigned to the gain received in the targeted direction Uzf. The ordinate axis 11 is scaled from 0 to −60 dB/p. In this diagram, the curve $C_{R5}$ represents the gain in elevation of the received signal for a given direction cosine, the radar being in nominal operation. In this diagram, the curve $C_{Corr3}$ represents the gain in elevation of the received signal for a given direction cosine corrected by a method according to the invention implementing a multiple linear interpolation, the radar being affected by the failure of one defective source.

The preceding description illustrates an example where a single row 1 of active modules 2 is defective. The same embodiment of the method according to the invention can be used to compensate for the failure of several rows 1 of active modules 2. In such a case, the same processing operation as described hereinabove is applied to each row 1 of defective active modules 2. Moreover, if several consecutive rows 1 of active modules 2 are defective, the rows 1 in nominal operation surrounding the defective rows are used for the interpolation. In the case of a radar comprising an antenna with electronic scanning in several planes, the interpolation is effected on all of the adjacent elements in the direction of the axis OZ, but also in the direction of the axis OY in order to enhance the efficiency of the rejection of the noise signals in one of the given solid angles oriented with respect to the directions Uz1, Uz2, . . . , Uzp.

A radar implementing an embodiment of the method according to the invention can notably be airborne. In addition, the method according to the invention can, for example, be used in the steps for processing the signal received by a weather radar. The method according to the invention can notably be implemented by a digital computer.

It will be readily seen by one of ordinary skill in the art that embodiments according to the present invention fulfill many of the advantages set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of determining a radar beam based upon a scanning antenna having active modules wherein at least one of the active modules is defective, the method comprising:
   orienting a main lobe of a microwave signal in a direction Uzf pointed to by a scanning antenna comprising active modules, the scanning being effected in one or more planes;
   sampling and identifying the active modules by a rank i and by coordinates in a reference base forming a plane within which the active modules of the antenna are substantially included, wherein the active modules are distributed according to a non-constant distribution law over a surface of the antenna;
   determining for each defective active module of rank ip, missing samples of the microwave signal a(ip) relating to the defective active module, by calculating one or more non-adaptive interpolations using the samples coming from the active modules in nominal operating mode situated in the neighborhood of the defective active modules, the beam being formed as if the interpolated samples a(ip) were the missing samples;
   wherein the non-adaptive interpolation step comprises the steps of:
      reducing the phase gradient equal to zero in the neighborhood of a particular direction Uz1 of the samples of the microwave signal coming from the active modules in nominal operating mode situated in the neighborhood of the defective active modules;
      non-adaptive linear interpolation of the missing samples of the microwave signal; and
      rephasing of the missing samples obtained in the preceding step.

2. The method as claimed in claim 1, wherein the method comprises the following steps:
   forming the beam by excluding the missing samples of the microwave signal a(ip);
   calculating using a non-adaptive linear interpolation of the estimations of the samples of the missing microwave signal $a_1(\hat{\imath}p), \ldots, a_P(\hat{\imath}p)$ starting from P assumptions of particular direction Uz1, Uz2, ..., Uzp;
   calculating signals $S_1 \ldots S_P$ according to the formula $S_1=S_0+W(ip)\times a_1(\hat{\imath}p), \ldots, S_P=S_0+W(ip)\times a_P(\hat{\imath}p)$ where W(ip) corresponds to the weighting coefficient of the sample from the defective module ip;
   normalizing the signals $S_1 \ldots S_P$ in such a manner that all the beams thus formed have the same gain in the directed orientation Uzf;
   selecting the signal $S_1 \ldots S_P$ whose measured power is the lowest amongst the full set of calculated signals.

3. The method as claimed in claim 2, wherein the method of claim 2 is applied to a radar designed for the detection and localization of weather phenomena.

4. A method of determining a radar beam based upon a scanning antenna having active modules wherein at least one of the active modules is defective, the method comprising:
   orienting a main lobe of a microwave signal in a direction Uzf pointed to by a scanning antenna comprising active modules, the scanning being effected in one or more planes;
   sampling and identifying the active modules by a rank i and by coordinates in a reference base forming a plane within which the active modules of the antenna are substantially included, wherein the active modules are distributed according to a non-constant distribution law over a surface of the antenna;
   determining for each defective active module of rank ip, missing samples of the microwave signal a(ip) relating to the defective active module, by calculating one or more non-adaptive interpolations using the samples coming from the active modules in nominal operating mode situated in the neighborhood of the defective active modules, the beam being formed as if the interpolated samples a(ip) were the missing samples;
   wherein the active modules of a scanning antenna in a plane are arranged in rows and have as coordinates a position along an axis perpendicular to the rows of active modules of the antenna, the method includes the active modules delivering, after sampling, samples a(i), the samples of the missing microwave signal a(îp) are defined, for a particular direction Uz1, according to the following formula:

$$a(\hat{ip}) = \left(\frac{z(ip+1)-z(ip)}{z(ip+1)-z(ip-1)} \times a(ip-1) + \frac{z(ip)-z(ip-1)}{z(ip+1)-z(ip-1)} \times a(ip+1)\right) \times \exp\left(+j2\pi\frac{Uz-Uz1}{\lambda}z(ip)\right)$$

being the rank of a defective active module.

5. The method of claim 4, comprising the following steps:
   forming the beam by excluding the missing samples of the microwave signal a(îp);
   calculating, by a non-adaptive linear interpolation of the estimations of the samples of the missing microwave signal $a_1(\hat{ip}),\ldots,a_P(\hat{ip})$ starting from P assumptions of particular direction Uz1, Uz2, ..., Uzp;
   calculating signals $S_1 \ldots S_P$ according to the formula $S_1=S_0+W(ip)\times a_1(\hat{ip}), \ldots, S_P=S_0+W(ip)\times a_P(\hat{ip})$ where W(ip) corresponds to the weighting coefficient of the sample from the defective module ip;
   normalizing signals $S_1 \ldots S_P$ in such a manner that all the beams thus formed have the same gain in the directed orientation Uzf;
   selecting the signal $S_1 \ldots S_P$ whose measured power is the lowest amongst the full set of calculated signals.

6. The method as claimed in claim 5, wherein a number of particular directions of the radar signal is a function of the number of defective active modules.

7. The method as claimed in claim 5, wherein it is applied to a radar designed for the detection and localization of weather phenomena.

8. A method of determining a radar beam based upon a scanning antenna having active modules wherein at least one of the active modules is defective, the method comprising:
   orienting a main lobe of a microwave signal in a direction Uzf pointed to by a scanning antenna comprising active modules, the scanning being effected in one or more planes;
   sampling and identifying the active modules by a rank i and by coordinates in a reference base forming a plane within which the active modules of the antenna are substantially included, wherein the active modules are distributed according to a non-constant distribution law over a surface of the antenna;
   determining for each defective active module of rank ip, missing samples of the microwave signal a(îp) relating to the defective active module, by calculating one or more non-adaptive interpolations using the samples coming from the active modules in nominal operating mode situated in the neighborhood of the defective active modules, the beam being formed as if the interpolated samples a(îp) were the missing samples;
   arranging the active modules of a scanning antenna in a plane area in rows and having as coordinates, a position along an axis perpendicular to the rows of active modules of the antenna;
   the active modules delivering, after sampling, samples a(i), the samples of the missing microwave signals a(îp) are defined according to the following formula:

$$a(\hat{ip}) = \frac{z(ip+1)-z(ip)}{z(ip+1)-z(ip-1)} \times a(ip-1) + \frac{z(ip)-z(ip-1)}{z(ip+1)-z(ip-1)} \times a(ip+1).$$

wherein ip is the rank of a defective active module.

9. A method of determining a radar beam based upon a scanning antenna having active modules wherein at least one of the active modules is defective, the method comprising:
   orienting a main lobe of a microwave signal in a direction Uzf pointed to by a scanning antenna comprising active modules, the scanning being effected in one or more planes;
   sampling and identifying the active modules by a rank i and by coordinates in a reference base forming a plane within which the active modules of the antenna are substantially included;
   determining for each defective active module of rank ip, missing samples of the microwave signal a(îp) relating to the defective active module, by calculating one or more non-adaptive interpolations using the samples coming from the active modules in nominal operating mode situated in the neighborhood of the defective active modules, the beam being formed as if the interpolated samples a(îp) were the real measurements and, wherein the active modules of a scanning antenna in a plane area are arranged in rows and have as coordinates a position along an axis perpendicular to the rows of active modules of the antenna, said active modules delivering, after sampling, samples a(i), the samples of the missing microwave signals a(îp) are defined according to the following formula:

$$a(\hat{ip}) = \frac{z(ip+1)-z(ip)}{z(ip+1)-z(ip-1)} \times a(ip-1) + \frac{z(ip)-z(ip-1)}{z(ip+1)-z(ip-1)} \times a(ip+1)$$

ip being the rank of a defective active module.

* * * * *